United States Patent [19]
Merwin et al.

[11] Patent Number: 5,867,017
[45] Date of Patent: Feb. 2, 1999

[54] ENERGY CONTROL SYSTEM WITH REMOTE SWITCHING

[75] Inventors: Jeffrey D. Merwin, Buffalo Grove; Dennis L. Stephens, Niles, both of Ill.

[73] Assignee: Motorola Inc., Schaumburg, Ill.

[21] Appl. No.: 837,583

[22] Filed: Apr. 21, 1997

[51] Int. Cl.$^6$ ........................................................ G05F 1/44
[52] U.S. Cl. ............................................ 323/320; 323/322
[58] Field of Search ..................................... 323/320, 322, 323/323, 324, 327, 239, 237; 340/825.7; 307/139, 140

[56] References Cited

U.S. PATENT DOCUMENTS

| | | |
|---|---|---|
| 3,558,902 | 1/1971 | Casey . |
| 3,846,671 | 11/1974 | Johnson . |
| 3,868,546 | 2/1975 | Gilbreath et al. . |
| 4,011,482 | 3/1977 | Seib . |
| 4,287,468 | 9/1981 | Sherman ................................. 323/322 |
| 4,377,754 | 3/1983 | Thompson . |
| 4,525,634 | 6/1985 | Southard . |
| 5,031,082 | 7/1991 | Bierend . |
| 5,170,068 | 12/1992 | Kwiatkowski . |
| 5,194,858 | 3/1993 | Erwin . |
| 5,227,762 | 7/1993 | Guidette et al. . |
| 5,373,224 | 12/1994 | Rabier et al. ............................. 323/244 |
| 5,498,946 | 3/1996 | Plummer et al. ......................... 318/809 |
| 5,583,423 | 12/1996 | Bangerter ................................. 323/239 |

OTHER PUBLICATIONS

Advertisement for Square D Company Jan., 1977 "Remote Control Relay System".

*Primary Examiner*—Adolf Deneke Berhane
*Attorney, Agent, or Firm*—Kenneth D. Labudda; Gary J. Cunningham

[57] ABSTRACT

An energy control system (10) comprises at least one controllable load (110), a master controller (200), a traveler wire (300) and at least one remote switch (400). The master controller (200) transmits control commands that effect corresponding control actions in the controllable load (110). The remote switch (400) transmits remote commands to the master controller (200) over the traveler wire (300). The energy control system (10) is well suited for installation in standard three-way switch or four-way switch electrical systems and requires neither additional wiring nor complicated installation procedures.

18 Claims, 7 Drawing Sheets

ENERGY CONTROL SYSTEM WITH REMOTE SWITCHING

FIELD OF THE INVENTION

The present invention relates to the general subject of energy control systems and, in particular, to an energy control system with remote switching.

BACKGROUND OF THE INVENTION

Energy control systems provide sophisticated, centralized control of loads in building electrical systems. The simplest types of energy control systems, such as triac light dimmers, operate by directly manipulating the AC current delivered to the loads. A serious disadvantage of such systems is that all loads downstream from the control station are affected, thus precluding control of the loads on an individual basis.

More advanced types of energy control systems provide individualized control of loads through communication between a centralized control station and the loads. The control station includes a transmitter for sending commands to the loads, and the loads contain receiver circuitry for accepting commands sent by the control station. The shortcomings of existing energy control systems become problematic when attempting to implement remote switching by which one or more loads can be controlled from multiple physical locations within a room or given area. Any provision for control of the loads from locations remote from the control station typically requires special communication wires and, in some cases, dictates that the control station be installed at a specific location in the branch circuit. Other options include employment of multiple central control stations and use of wireless or powerline communication methods to relay commands from the remote switches to the control station. Either way, the resulting systems tend to be materially expensive, difficult and time-consuming to install, and ill-suited for retrofit applications in conventional electrical systems. Consequently, deployment of such systems has been largely limited to high-end industrial and business applications.

It is therefore apparent that a need exists for a cost-effective energy control system that provides full remote control capability and that can be easily installed in conventional electrical systems without a need for additional wiring or complicated installation procedures. Such a system would represent a considerable advance over the prior art.

DETAILED DESCRIPTION OF THE PREFERRED EMBODIMENTS

Figure 1:
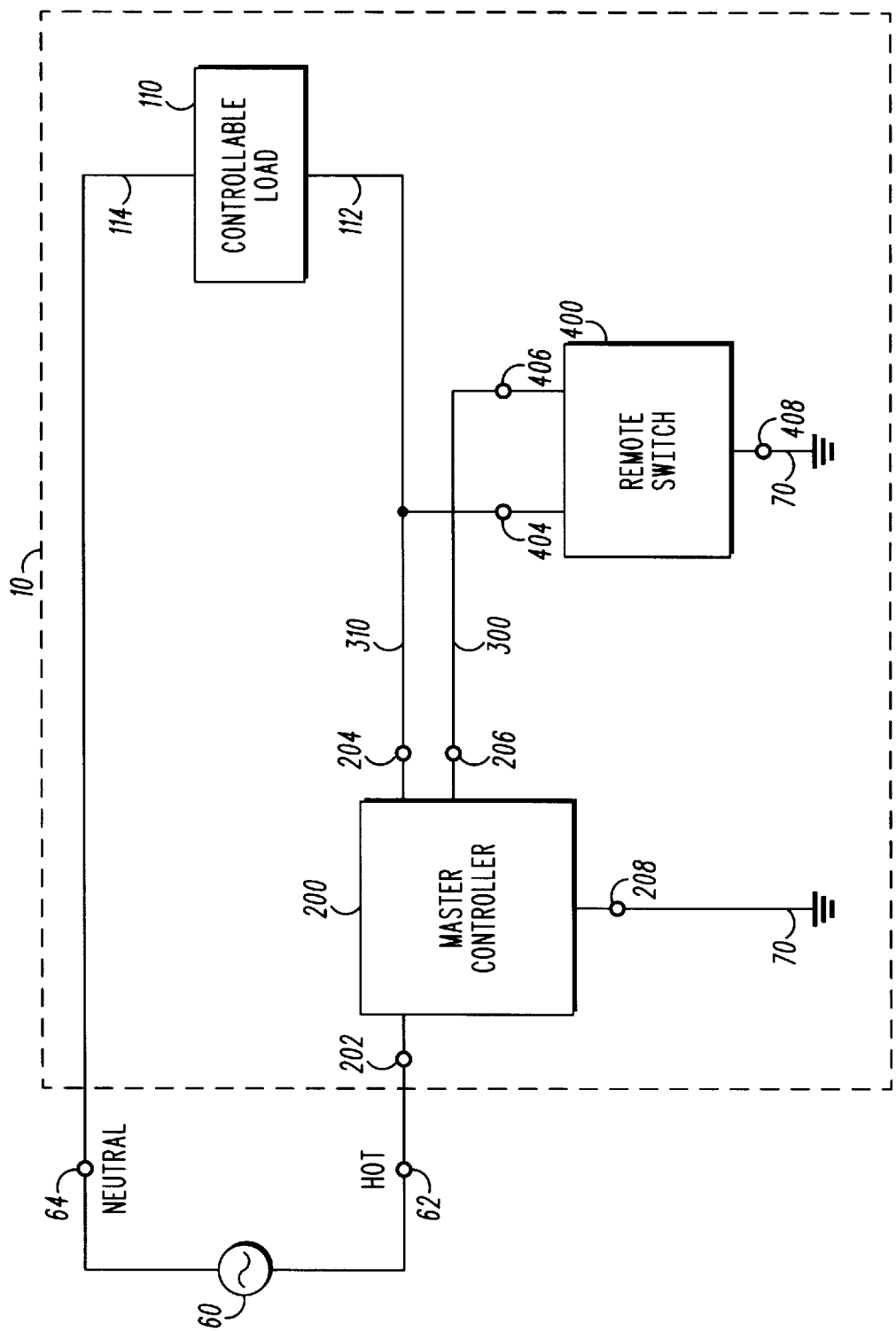
FIG. 1 is a block diagram of an energy control system with a single controllable load and a single remote switch, in accordance with the present invention.

FIG. 1 describes an energy control system 10 for use with an alternating current (AC) source 60 having a hot wire 62 and a neutral wire 64. Energy control system 10 comprises at least one controllable load 110, a master controller 200, a traveler wire 300, and a remote switch 400. Controllable load 110 includes a hot terminal 112 and a neutral terminal 114, the latter being coupled to the neutral wire 64 of AC source 60. Master controller 200 has an AC input connection 202 coupled to hot wire 62, an AC output connection 204 coupled to the hot terminal 112 of controllable load 110 via a main power wire 310, a traveler connection 206 coupled to traveler wire 300, and an earth ground connection 208 coupled to earth ground 70. Master controller 200 is operable to transmit a control command that is received and executed by controllable load 110. Remote switch 400 includes a hot connection 404 coupled to the hot terminal 112 of controllable load 110, a traveler connection 406 coupled to traveler wire 300, and an earth ground connection 408 coupled to earth ground 70. Remote switch 400 is operable to electrically transmit a remote command to master controller 200 via traveler wire 300. Master controller 200 is operable to receive the remote command and to transmit a corresponding control command to controllable load 110.

In existing electrical branch circuits that are wired for conventional threeway or four-way switches, traveler wire 300 and main power wire 310 are typically located within the same conduit or cable. That is, traveler wire 300 is not necessarily an additional wire that must be added as part of the installation of energy control system 10. Furthermore, in contrast with many existing energy control systems, master controller 200 and remote switch 400 do not require connections to neutral wire 64. Since neutral wire 64 is often inaccessible at each switchbox in the branch circuit, energy control system 10 is thus well-suited for installation within conventional electrical systems.

Figure 2:
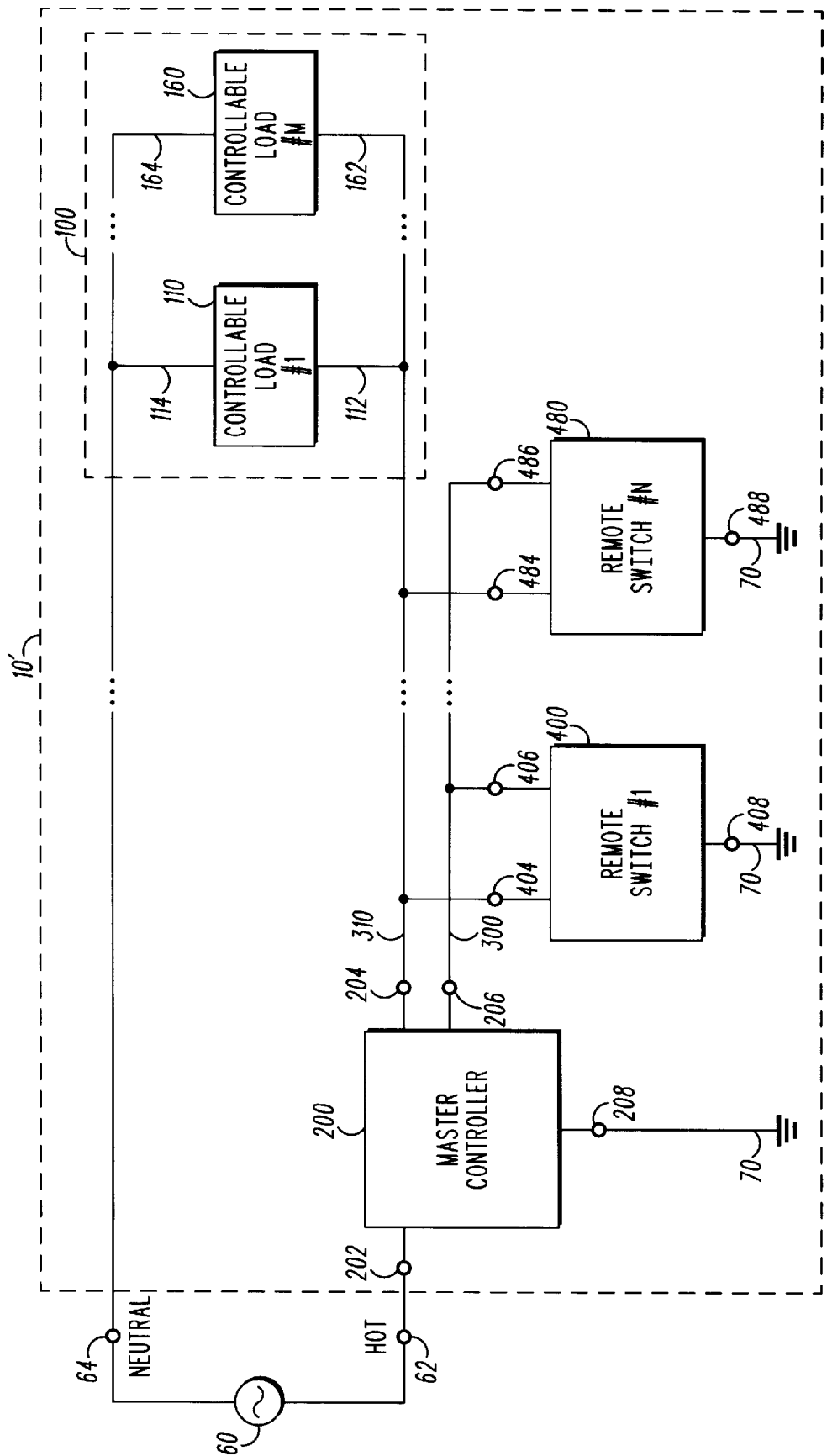
FIG. 2 is a block diagram of an energy control system with multiple controllable loads and multiple remote switches, in accordance with the present invention.

Energy control system 10 is expandable to include multiple remote switches and multiple controllable loads. As illustrated in FIG. 2, energy control system 10' comprises N remote switches 400, . . . ,480 and a plurality of loads 100 that includes M controllable loads 110, . . . ,160. Each of the controllable loads 110, . . . , 160 includes a hot terminal 112, . . . , 162 and a neutral terminal 114, . . . , 164. It is important to appreciate that the relative positions of master controller 200 and remote switches 400, . . . , 480 are not limited to those shown in FIG. 2. For example, master controller 200 may be positioned to the right of, or interposed between, remote switches 400, . . . , 480 without compromising or otherwise detracting from the functionality of energy control system 10'. Further, the plurality of loads 100 may include one or more conventional loads, such as ordinary incandescent lights, that are not subject to control by master controller 200.

In one embodiment of energy control system 10', the plurality of loads 100 includes at least two controllable loads and master controller 200 is operable to transmit an individualized command that effects a corresponding control action in only one of the controllable loads, while leaving the other controllable loads unaffected. Master controller 200 is also operable to transmit a master command that effects a control action in all of the controllable loads. Furthermore, for those applications in which three or more controllable loads are present, master controller 200 is operable to transmit a group command that effects a control action in at least two, but not all, of the controllable loads. Thus, energy control system 10' may be employed to provide different levels of control (i.e., individual, group, and master) over a given set of controllable loads.

Figure 3:
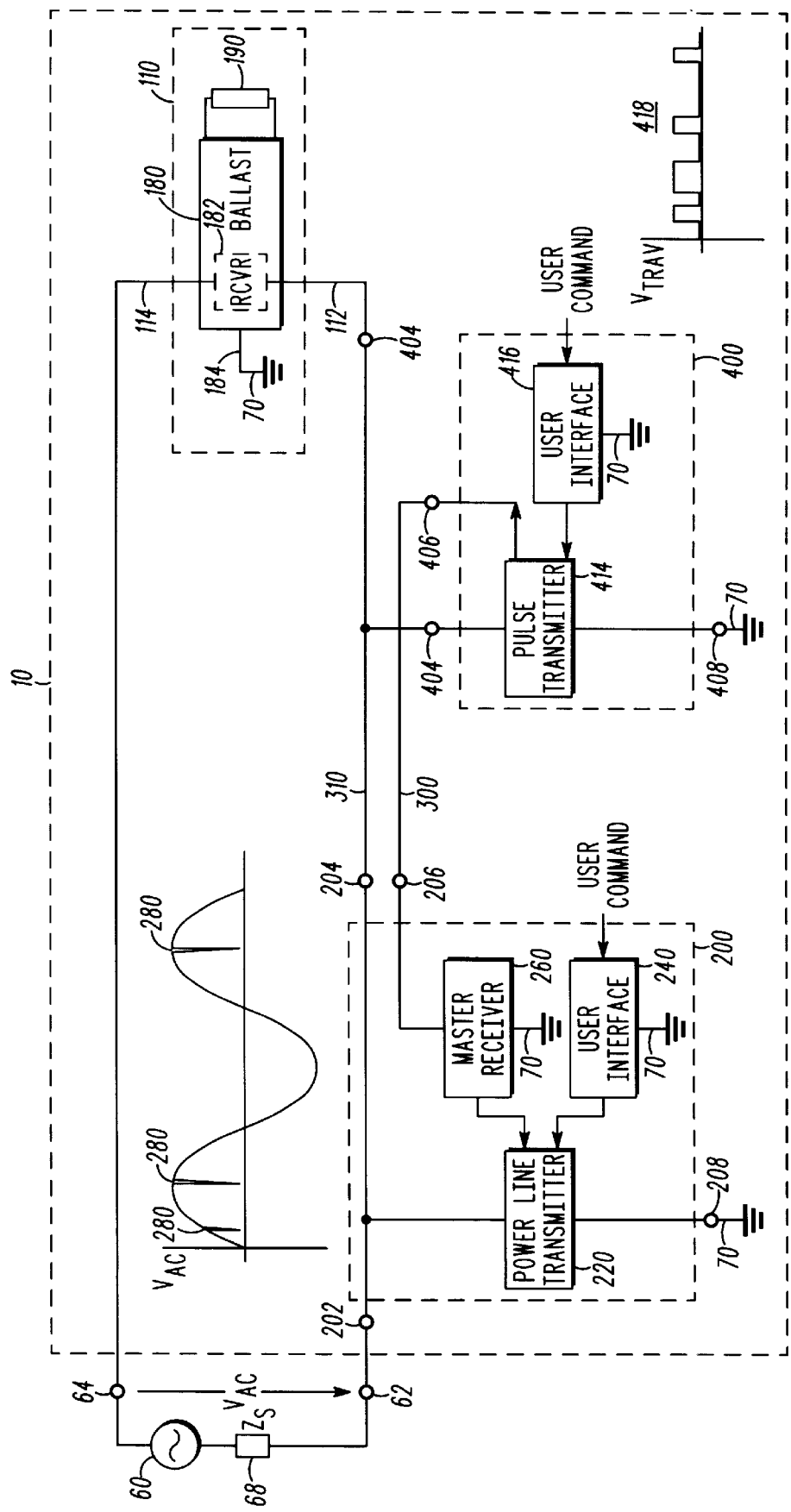
FIG. 3 describes preferred structures for the master controller and remote switch, in accordance with a preferred embodiment of the present invention.

Turning now to FIG. 3, in a preferred embodiment of energy control system 10, master controller 200 comprises a power line transmitter 220, a user interface 240, and a master receiver 260. Power line transmitter 220 is coupled between AC input connection 202, AC output connection 204, and earth ground 70. Power line transmitter 220 preferably transmits control commands to controllable load 110 by inducing a sequence of depressions 280 in the voltage, $V_{AC}$, supplied by AC source 60. In one embodiment, power line transmitter 220 inserts a depression 280 in $V_{AC}$ by coupling AC input connection 202 to earth ground connection 208 for a brief period of time that is preferably on the order of 100 microseconds or less. This causes a relatively large current to flow from AC source 60 to earth ground 70. However, because AC source 60 has an internal source impedance 68 (denoted $Z_s$), the relatively large current that flows produces a considerable voltage drop across source impedance 68, with the result that $V_{AC}$ decreases significantly.

As shown in FIG. 3, user interface 240 is coupled to power line transmitter 220 and is operable to accept a user command (entered by way of a keypad or an array of pushbuttons or switches, for example) and to subsequently direct power line transmitter 220 to transmit a corresponding control command to load 110. Master receiver 260, coupled between traveler connection 206 and power line transmitter 220, accepts remote commands from remote switch 400 and then directs power line transmitter 220 to transmit corresponding control commands to load 110.

In a preferred embodiment of energy control system 10, remote switch 400 comprises a pulse transmitter 414 and a user interface 416. Pulse transmitter 414, coupled between hot connection 404 and earth ground connection 408, is coupled to traveler connection 406 and is operable to send remote commands to master controller 200. In one embodiment, pulse transmitter 414 sends remote commands to master controller 200 by transmitting a predetermined sequence of voltage pulses 418 (denoted $V_{TRAV}$) over traveler wire 300. User interface 416, which preferably includes a keypad or an array of pushbuttons or switches, is coupled to pulse transmitter 414 and is operable to accept a user command and to direct pulse transmitter 414 to send a corresponding remote command to master controller 200. The voltage pulses 418 sent by pulse transmitter 414 are received by master receiver 260, which then directs power line transmitter 220 to transmit a corresponding control command to load 110.

Remote switch 400 may be implemented in a relatively simple and low-cost manner, with the greater complexity being placed in master controller 200. Since only one master controller 200 is required, this strategy optimizes the cost-effectiveness of the overall system 10 for those applications in which multiple remote switches are employed.

Referring again to FIG. 3, in a preferred embodiment of energy control system 10, at least one controllable load 110 comprises a controllable electronic ballast 180 for powering at least one fluorescent lamp 190. In accordance with conventional safety practices, ballast 180 includes a ground terminal 184 coupled to earth ground 70. Ballast 180 also includes a receiver 182 for receiving control commands sent by master controller 200 and is operable, in response to control commands sent by master controller 200, to turn on, turn off, and vary the illumination level of lamp 190. Accordingly, remote switch 400 is operable to send remote commands to master controller 200 corresponding to control commands that effect turn on and turn off of ballast 180, as well as adjustment of the illumination level of lamp 190.

Figure 4:
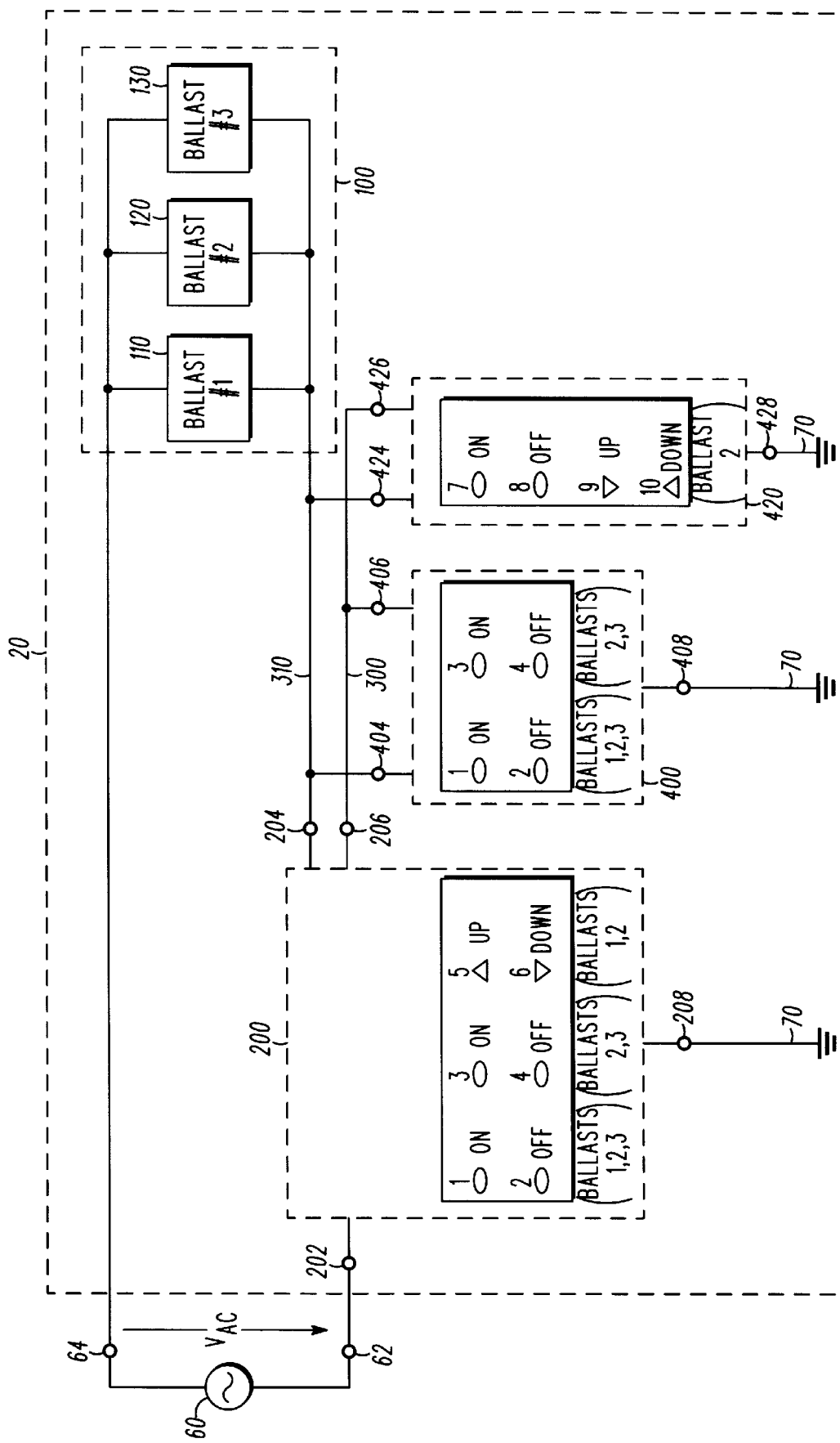
FIG. 4 illustrates an example application of an energy control system, in accordance with one embodiment of the present invention.

Turning now to FIG. 4, additional details pertaining to the installation and operation of energy control system 10 are discussed by way of an example as follows. In this example, energy control system 20 includes three controllable electronic ballasts 110,120,130 along with their associated lamps (not shown) and two remote switches 400,420. As shown in FIG. 4, master controller 200 and remote switches 400,420 preferably include user interfaces having arrays of pushbuttons by which user commands can be entered. The pushbuttons are shown numerically labeled according to their "type," which uniquely specifies the sequence of pulses that will be sent when that button is pressed. For example, button "1" of master controller 200 produces the same sequence of voltage pulses when pressed as button "1" of first remote switch 400.

As part of the installation of energy control system 10, master controller 200 executes an appropriate configuration routine that provides: (i) assignment of a unique address to each of the ballasts 110,120,130; and (ii) assignment of a particular control command and a corresponding ballast or group of ballasts to each pushbutton "type" on the user interfaces of master controller 200 and remote switches 400,420. For instance, in the example of FIG. 4, a "type 1" pushbutton is assigned to control turn on of all three ballasts 110,120,130, while a "type 9" pushbutton controls increases in the light output of ballast 120 and its associated lamps. Depending on the functional complexity of system 20, as well as the specific hardware used to realize master controller 200 and remote switches 400,420, the configuration routine will typically require interaction of the part of the installer with regard to designating the ballast(s) and control action(s) to be assigned to each pushbutton type.

Referring again to FIG. 4, and assuming that an appropriate configuration routine has been executed, the user interfaces of master controller 200, first remote switch 400, and second remote switch 420 are configured to accept various individual, group, and master commands. Specifically, master controller 200 is configured to accept user commands that control: (i) turn on and turn off of all three ballasts 110,120,130 (buttons 1,2); (ii) turn on and turn off of ballasts 120,130 (buttons 3,4); and (iii) dimming of ballast 130 ("arrow" buttons 5,6). First remote switch 400 includes pushbuttons that control: (i) turn on and turn off of all three ballasts 110,120,130 (buttons 1,2); and (ii) turn on and turn off of ballasts 1,2 (buttons 3,4). Finally, remote switch 420 is configured to provide turn on, turn off, and dimming of ballast 120 (buttons 7–10).

Referring again to FIG. 4, as an example of an individualized command, when a user presses button 7 of remote switch 420, a remote command is sent to master controller 200 by placing a "type 7" sequence of voltage pulses on traveler wire 300. Preferably, the sequence of voltage pulses need only convey enough information to uniquely identify the "type" of the remote button that was pressed. Master controller 200 receives the voltage pulses and, by way of a "look-up" table or similar means generated in the configuration routine, identifies the corresponding control command (turn on) as well as the load (ballast #3) for which the control command is intended. Master receiver 260 then directs power line transmitter 220 to induce a sequence of depressions in $V_{AC}$ that conveys both the assigned address of ballast 110 and the control command to turn on. A power line receiver internal to ballast 130 accepts the control command and directs ballast 130 to execute the control action. Since the sequence of depressions in $V_{AC}$ does not specify their assigned addresses, ballasts 110,120 ignore the control command and thus do not execute any control action in response. In this way, energy control system 10 provides control over an individual load even when multiple controllable loads are present.

Master controller 200 may likewise be configured to accept user commands corresponding to individualized, group, and master commands. In the example described in FIG. 4, buttons 1 and 2 of master controller 200 are assigned to correspond to master ON and master OFF commands. When a user presses button 1 of master controller 200, master controller 200 induces a sequence of depressions in $V_{AC}$ that specify a master address and a control command to turn on. The depressions in $V_{AC}$ are accepted and processed by all three ballasts 110,120,130, with the result that all three ballasts turn on. Other pushbuttons on the user interface of master controller 200 are assigned to accept group commands. For example, buttons 3 and 4 are assigned to correspond to group commands that effect turn on and turn off of ballasts 120,130, while buttons 5 and 6 are assigned to correspond to group commands that control dimming in ballasts 110,120.

Master controller 200 may also include functions that are not readily available on its user interface, but that may be accessed via key combinations or special switches. For example, master controller 200 may be programmed to automatically implement energy conservation strategies, such as reducing the light output of a certain group of ballasts in response to variation in natural ambient light levels during the daytime, or regularly turning the ballasts off at a certain time (e.g. late evening) and then back on again at another time (e.g. early morning).

Figure 5:
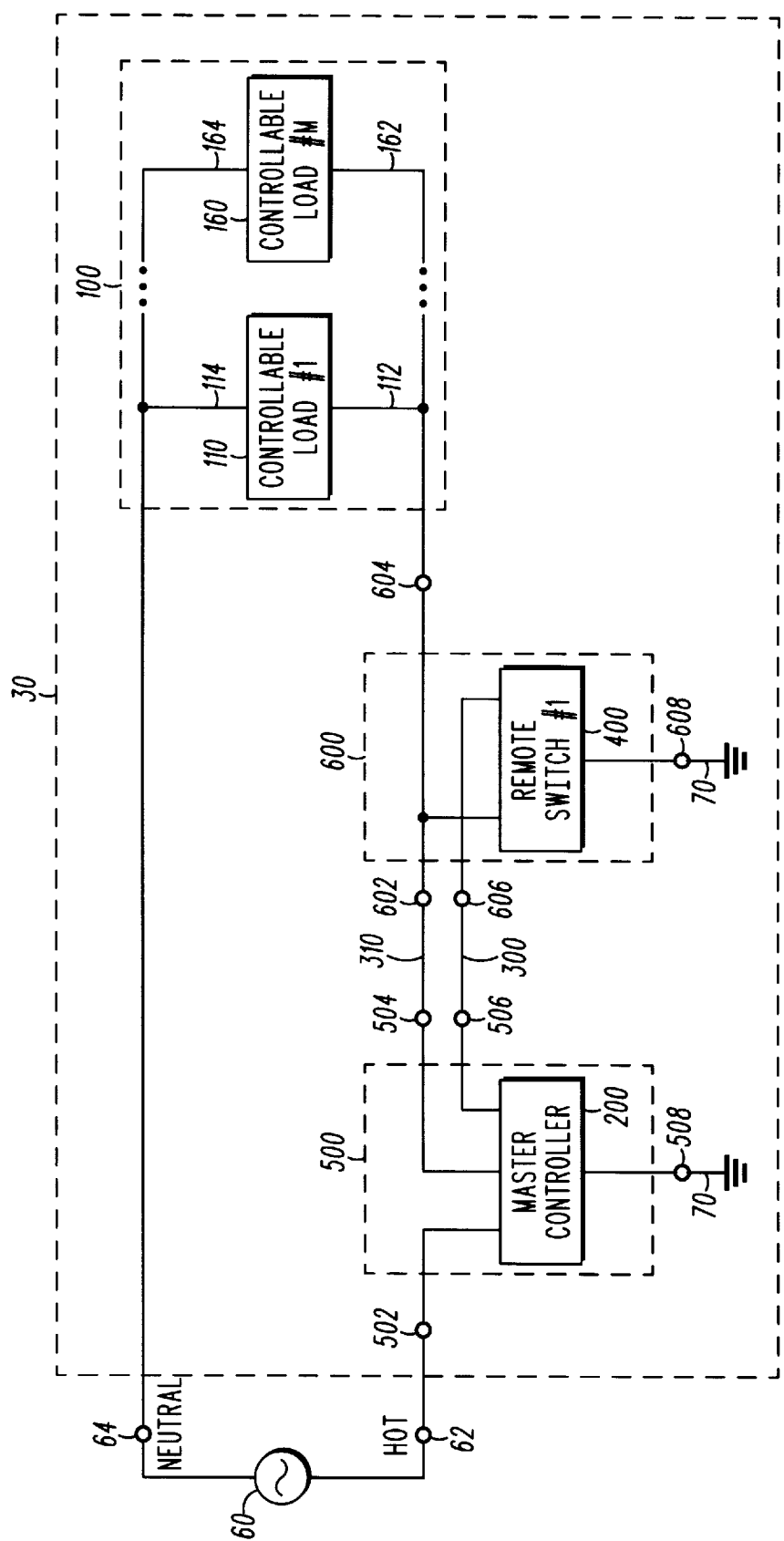
FIG. 5 describes an energy control system with a single remote switch implemented within a standard three-way switch branch circuit, in accordance with the present invention.

FIG. 5 describes the installation of energy control system 10 within the framework of a standard electrical system that is wired for conventional three-way or four-way switches. Specifically, energy control system 30 comprises a plurality of loads 100, a master controller 200, a traveler wire 300, a main power wire 310, a remote switch 400, a first switchbox 500, and a second switchbox 600. The plurality of loads 100 includes multiple controllable loads 110, . . . ,160, each having a hot terminal 112, . . . ,162 and a neutral terminal 114, . . . ,164. First switchbox 500 has an input hot connection 502 coupled to hot wire 62, an output hot connection 504 coupled to main power wire 310, a traveler connection 506 coupled to traveler wire 300, and an earth ground connection 508 coupled to earth ground 70. Second switchbox 600 has an input hot connection 602 coupled to main power wire 310, an output hot connection 604 coupled to the hot terminals 112, . . . ,162 of controllable loads 110, . . . ,160, a traveler connection 606 coupled to traveler wire 300, and an earth ground connection 608 coupled to earth ground 70.

For the sake of illustration in FIG. 5, master controller 200 is shown installed in first switchbox 500, and remote switch 400 is shown installed in second switchbox 600. However, it is important to note that master controller 200 may just as well be installed in second switchbox 600, and remote switch 400 installed in first switchbox 500, without compromising or otherwise detracting from the resulting functionality of energy control system 30. Thus, energy control system 30 has an inherent symmetry that greatly simplifies installation by allowing placement of master controller 200 in any available switchbox of the branch circuit.

In an existing electrical system that is already wired for conventional three-way or four-way switches, main power wire 310 and traveler wire 300 are physically located within the same cable or conduit. Thus, energy control system 30 is well-suited for retrofit applications and requires no additional wiring or conduit beyond that which is already present in existing three-way and four-way branch circuits.

Figure 6:
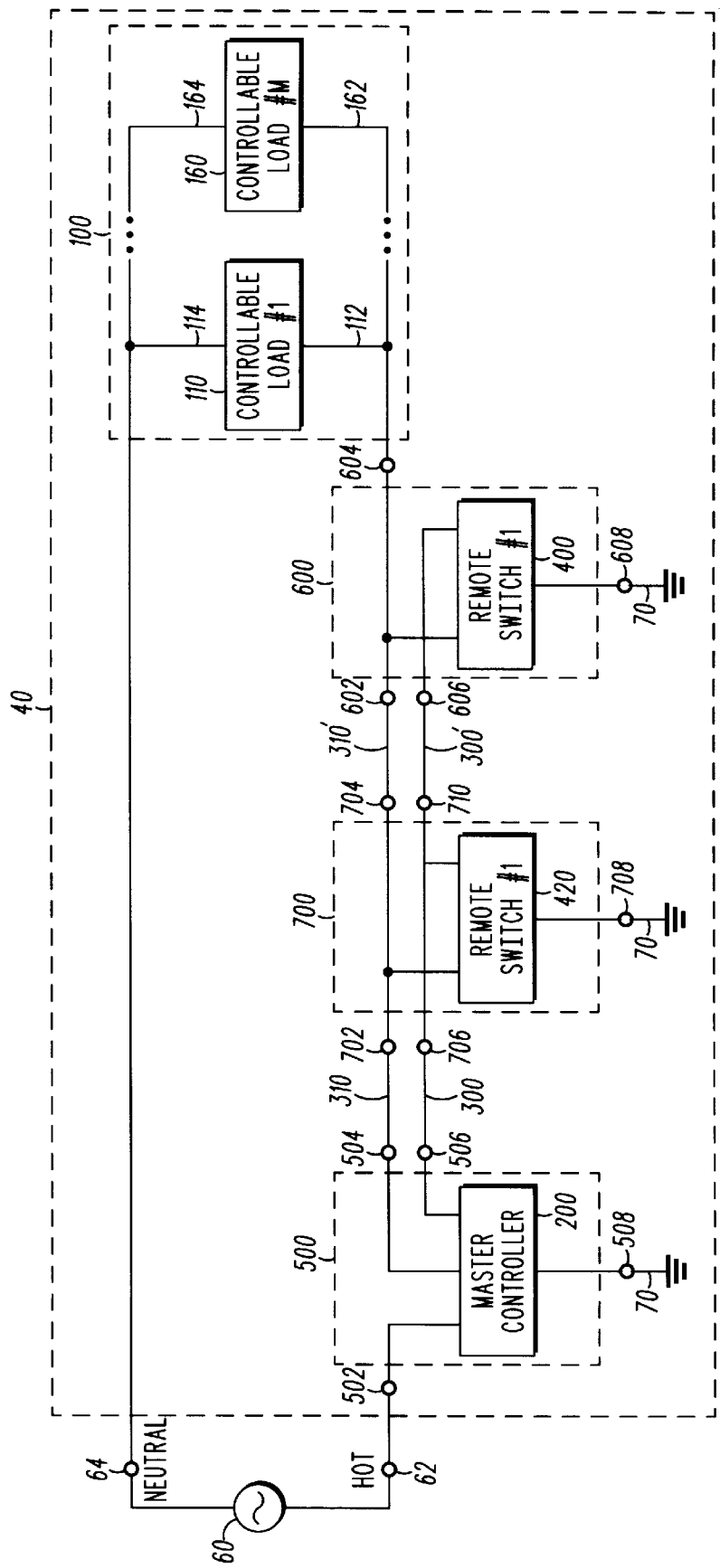
FIG. 6 describes an energy control system implemented within a standard three-way switch branch circuit and expanded to include multiple remote switches, in accordance with the present invention.

As indicated previously, energy control system 30 is expandable to accommodate multiple remote switches. For example, as shown in FIG. 6, energy control system 40 includes a second remote switch 420 installed in a third switchbox 700. Third switchbox 700, which is electrically situated between first switchbox 500 and second switchbox 600, includes an input hot connection 702 coupled to the output hot connection 504 of first switchbox 500 via main power wire 310, an output hot connection 704 coupled to the input hot connection 602 of second switchbox 600 via a second portion 310' of main power wire 310, a first traveler connection 710 coupled via traveler wire 300 to the traveler connection 506 of first switchbox 500, a second traveler connection 712 coupled via a second portion 300' of traveler wire 300 to the traveler connection 606 of second switchbox 600, and an earth ground connection 708 coupled to earth ground 70. Additional switchboxes and remote switches may be added in an analogous manner.

Figure 7:
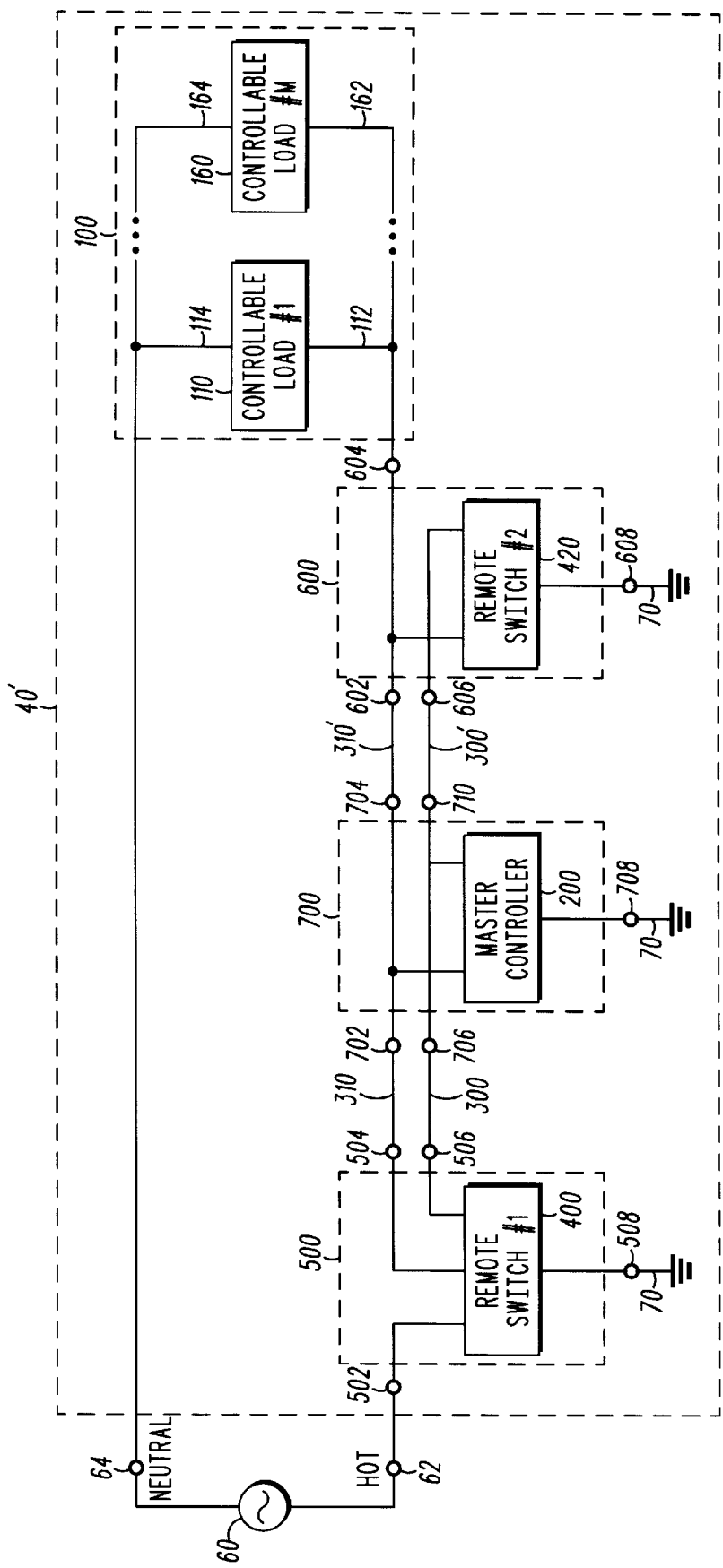
FIG. 7 illustrates an alternative installation for the energy control system of FIG. 6.

As explained previously, proper operation of energy control system 40 is not dependent upon the relative positions of master controller 200 and remote switches 400,420. For example, as shown in FIG. 7, master controller 200 may just as well be installed in third switchbox 700, and remote switches 400,420 installed in switchboxes 500,600, with no detriment to system function or performance.

Energy control system 10, as well as its various embodiments described above, provides a number of important advantages over existing approaches. First, energy control system 10 is a "plug and play" type of system that offers exceptional ease of installation in new buildings and in existing electrical systems. Specifically, energy control system 10 requires no dedicated control wiring, does not require that the master controller 200 be installed in a particular switchbox, and utilizes a single traveler wire 300 (that is already present in existing three-way and four-way switching systems) to convey remote commands from the remote switches 400, . . . ,480 to the master controller 200. Furthermore, energy control system 10 provides not only remote on/off control, but other functions such as dimming of fluorescent lamps. The result is an energy control system that offers a full range of control over multiple loads, but that is materially economical and relatively easy to install.

Although the present invention has been described with reference to a certain preferred embodiment, numerous modifications and variations can be made by those skilled in the art without departing from the novel spirit and scope of this invention.

What is claimed is:

1. An energy control system for use with an alternating current (AC) source having a hot wire and a neutral wire, comprising:

at least one controllable load having a hot terminal and a neutral terminal, the neutral terminal being coupled to the neutral wire of the AC source;

a traveler wire;

a master controller having an AC input connection coupled to the hot wire of the AC source, an AC output connection coupled to the hot terminal of at least one controllable load, a traveler connection coupled to the traveler wire, and an earth ground connection coupled to earth ground, the master controller being operable to transmit a control command that is received and executed by at least one controllable load;

at least one remote switch having a hot connection coupled to the hot terminal of at least one controllable load, a traveler connection coupled to the traveler wire, and an earth ground connection coupled to earth ground, the remote switch being operable to electrically transmit a remote command to the master controller via the traveler wire;

wherein the master controller is operable to receive the remote command and to transmit a corresponding control command to at least one controllable load; and wherein the master controller further comprises:

a power line transmitter coupled between the AC input and earth ground connections of the master controller, the AC input connection being coupled to the AC output connection, the power line transmitter being operable to transmit a control command to at least one controllable load by inducing a sequence of depressions in the voltage supplied by the AC source;

a user interface coupled to the power line transmitter, the user interface being operable to accept a user command and to direct the power line transmitter to transmit a corresponding control command to at least one controllable load; and a master receiver coupled between the power line transmitter and the traveler connection of the master controller, the master receiver being operable to accept a remote command from the remote switch and to direct the power line transmitter to transmit a corresponding control command to at least one controllable load.

2. The energy control system of claim 1, wherein the remote switch is operable to send remote commands to the master controller corresponding to control commands that effect turn on, turn off, and variation in the amount of electrical power consumed by at least one controllable load.

3. The energy control system of claim 1, wherein the remote switch is operable to send a remote command to the master controller by transmitting a predetermined sequence of voltage pulses over the traveler wire.

4. The energy control system of claim 1, wherein the master controller further comprises a master receiver for receiving a remote command sent by the remote switch and for translating the remote command into a corresponding control command.

5. The energy control system of claim 1, further comprising a plurality of loads that includes at least two controllable loads, wherein the master controller is operable to transmit an individualized command that effects a control action in only one of the controllable loads.

6. The energy control system of claim 1, further comprising a plurality of loads that includes at least two controllable loads, wherein the master controller is operable to transmit a master command that effects a control action in all of the controllable loads.

7. The energy control system of claim 1, further comprising a plurality of loads that includes at least three controllable loads, wherein the master controller is operable to transmit a group command that effects a control action in at least two, but not all, of the controllable loads.

8. The energy control system of claim 1, wherein at least one controllable load comprises an electronic ballast for powering at least one fluorescent lamp.

9. The energy control system of claim 8, wherein the ballast is operable, in response to control commands sent by the master controller, to turn on, turn off, and vary the illumination level of the lamps.

10. The energy control system of claim 9, wherein the remote switch is operable to send remote commands to the master controller corresponding to control commands that effect:

(i) turn on and turn off of the ballast; and (ii) adjustment of the illumination level of the lamps.

11. An energy control system for use with an alternating current (AC) source having a hot wire and a neutral wire, comprising:

at least one, controllable load having a hot terminal and a neutral terminal, the neutral terminal being coupled to the neutral wire of the AC source;

a traveler wire;

a master controller having an AC output connection coupled to the hot wire of the AC source, an AC output connection coupled to the hot terminal of at least one controllable load, a traveler connection coupled to the traveler wire, and an earth ground connection coupled to earth ground, the master controller being operable to transmit a control command that is received and executed by at least one controllable load;

at least one remote switch having a hot connection coupled to the hot terminal of at least one controllable load, a traveler connection coupled to the traveler wire, and an earth ground connection coupled to earth ground, the remote switch being operable to electrically transmit a remote command to the master controller via the traveler wire;

wherein the master controller is operable to receive the remote command and to transmit a corresponding control command to at least one controllable load; and wherein the remote switch further comprises:

a pulse transmitter coupled between the hot and earth ground connections of the remote switch, the pulse transmitter being coupled to the traveler wire and operable to send remote commands to the master controller by transmitting a predetermined sequence of voltage pulses over the traveler wire; and a user interface coupled to the pulse transmitter, the user interface being operable to accept a user command and to direct the pulse transmitter to send a corresponding remote command to the master controller.

12. An energy control system for use with an alternating current (AC) source having a hot wire and a neutral wire, comprising:

a plurality of loads comprising at least two controllable loads, each controllable load having a hot terminal and a neutral terminal, the neutral terminal being coupled to the neutral wire of the AC source;

a main power wire;

a traveler wire;

a first switchbox having an input hot connection coupled to the hot wire of the AC source, an output hot connection coupled to the main power wire, a traveler connection coupled to the traveler wire, and an earth ground connection coupled to earth ground;

a second switchbox having an input hot connection coupled to the main power wire, an output hot connection coupled to the hot terminals of the controllable loads, a traveler connection coupled to the traveler wire, and an earth ground connection coupled to earth ground;

a master controller coupled to the input hot, output hot, earth ground, and traveler connections of the first switchbox, the master controller including a power line transmitter operable to transmit a control command to the loads by inducing a sequence of depressions in the voltage supplied by the AC source, the control command effecting a corresponding control action in at least one of the controllable loads, the master controller being further operable to transmit:

(i) an individualized command that effects a control action in only one of the controllable loads; and (ii) a master command that effects a control action in all of the controllable loads;

wherein each of the controllable loads includes a receiver for receiving control commands sent by the master controller; and a remote switch coupled to the input hot, output hot, earth ground, and traveler connections of the second switchbox, wherein the remote switch is coupled to the master controller via the traveler wire and includes a pulse transmitter that is operable to send a remote command to the master controller by transmitting a sequence of voltage pulses over the traveler wire, the remote command corresponding to a desired control command that, following reception of the remote command by the master controller, is transmitted to the loads by the master controller, the remote switch being further operable to send remote commands to the master controller corresponding to control commands that effect turn on, turn off, and variation in the amount of electrical power consumed by at least one of the controllable loads.

13. The energy control system of claim 12, further comprising:

a third switchbox interposed between the first and second switchboxes, the third switchbox having an input hot connection coupled to the output hot connection of the first switchbox, an output hot connection coupled to the input hot connection of the second switchbox, a first traveler connection coupled to the traveler connection of the first switchbox, a second traveler connection coupled to the traveler connection of the second switchbox, and an earth ground connection coupled to earth ground;

a second remote switch coupled to the input hot, output hot, earth ground, and traveler connections of the third switchbox, wherein the second remote switch is coupled to the master controller via the traveler wire and includes a pulse transmitter that is operable to send a remote command to the master controller by transmitting a predetermined sequence of voltage pulses over the traveler wire.

14. The energy control system of claim 12, wherein the master controller further comprises a master receiver for receiving a remote command sent by the remote switch and for directing the power line transmitter to transmit a corresponding control command to at least one of the controllable loads.

15. The energy control system of claim 12, wherein the plurality of loads includes at least three controllable loads and the master controller is operable to transmit a group command that effects a control action in at least two, but not all, of the controllable loads.

16. The energy control system of claim 12, wherein:

the master controller includes a user interface for accepting a user command and for directing the power line transmitter to send a corresponding control command to at least one of the controllable loads; and each remote switch includes a user interface for accepting a user command and for directing the pulse transmitter to send a corresponding remote command to the master controller.

17. The energy control system of claim 12, wherein at least one controllable load comprises an electronic ballast for powering fluorescent lamps, the ballast being operable, in response to control commands sent by the master controller, to turn on, turn off, and vary the illumination level of the lamps.

18. An energy control system for use with a conventional alternating current (AC) source having a hot wire and a neutral wire, comprising:

a plurality of controllable loads coupled in parallel with each other, each load having a hot terminal and a neutral terminal, the neutral terminal being coupled to the neutral wire of the AC source;

a main power wire;

a traveler wire;

a plurality of switchboxes interposed between the hot wire of the AC source and the hot terminals of the loads, each of the switchboxes having an input hot connection, an output hot connection, a traveler connection coupled to the traveler wire, and an earth ground connection coupled to earth ground;

a master controller coupled to the input hot, output hot, earth ground, and traveler connections of a first switchbox, the master controller being operable to transmit a control command that effects a corresponding control action in at least one of the loads, and a group command that effects a control action in at least two, but not all, of the loads;

at least one remote switch, each remote switch being coupled to the input hot, output hot, earth ground, and traveler connections of a corresponding switchbox, each remote switch being coupled to the master controller via the traveler wire and operable to transmit remote commands to the master controller, the remote commands corresponding to control commands that effect turn on, turn off, and variation in the amount of electrical power consumed by at least one of the controllable loads;

the master controller comprising:

a power line transmitter coupled between the input hot, output hot, and traveler connections of the first switchbox, the power line transmitter being operable to transmit a control command to the loads by inducing a sequence of depressions in the voltage supplied by the AC source;

a user interface coupled to the power line transmitter, the user interface being operable to accept a user command and to direct the power line transmitter to transmit a corresponding control command; and a master receiver coupled between the power line transmitter and the traveler connection of the first switchbox, the master receiver being operable to accept a remote command from the remote switch and to direct the power line transmitter to transmit a corresponding control command;

each remote switch comprising:

a pulse transmitter coupled to the traveler wire, the pulse transmitter being operable to send remote commands to the master controller by transmitting a predetermined sequence of pulses over the traveler wire; and a user interface coupled to the pulse transmitter, the user interface being operable to accept a user command and to direct the pulse transmitter to send a corresponding remote command;

each of the controllable loads including a receiver for receiving control commands sent by the master controller; and at least one of the controllable loads being operable, in response to control commands sent by the master controller, to turn on, turn off, and adjust the amount of electrical power drawn by the load from the AC source.

* * * * *

UNITED STATES PATENT AND TRADEMARK OFFICE
CERTIFICATE OF CORRECTION

PATENT NO.    : 5,867,017
DATED         : February 2, 1999
INVENTOR(S)   : Merwin et al.

It is certified that error appears in the above-identified patent and that said Letters Patent is hereby corrected as shown below:

Column 8, claim 11, line 18 reads "a master controller having an AC output connection" should be -- a master controller having an AC input connection--.

Signed and Sealed this

Thirty-first Day of August, 1999

Attest:

Q. TODD DICKINSON

*Attesting Officer*      *Acting Commissioner of Patents and Trademarks*